United States Patent [19]
Takeuchi et al.

[11] Patent Number: 5,498,494
[45] Date of Patent: Mar. 12, 1996

[54] PREPARATION OF SILVER VANADIUM OXIDE CATHODES USING AG2O AND V2O5 AS STARTING MATERIALS

[75] Inventors: Esther S. Takeuchi, Williamsville; William C. Thiebolt, III, Tonawanda, both of N.Y.

[73] Assignee: Wilson Greatbatch Ltd., Clarence, N.Y.

[21] Appl. No.: 385,991

[22] Filed: Feb. 14, 1995

Related U.S. Application Data

[63] Continuation of Ser. No. 66,982, May 25, 1993, abandoned.

[51] Int. Cl.$^6$ ............................... H01M 4/04; H01M 4/06
[52] U.S. Cl. ............................... 429/219; 423/23; 423/62; 423/593; 252/518; 264/104
[58] Field of Search ........................ 429/219; 423/23.62, 423/593; 252/518; 264/104; 23/293 F; 29/623.1

[56] References Cited

U.S. PATENT DOCUMENTS

| | | | |
|---|---|---|---|
| 4,310,609 | 1/1982 | Liang et al. | 429/194 |
| 4,830,940 | 5/1989 | Keister | 429/194 |
| 5,221,453 | 6/1993 | Crespi | 423/593 |

FOREIGN PATENT DOCUMENTS

| | | | |
|---|---|---|---|
| 478303A2 | 4/1992 | European Pat. Off. . | |
| 231271 | 9/1989 | Japan . | |
| 2065957 | 7/1981 | United Kingdom | 429/219 |

OTHER PUBLICATIONS

E. Wenda; Journal of Thermal Analysis; 1985; 879–887; Phase Diagram of $V_2O_5$–$MoO_3$–$AgO_2$.

Pascal Fleury; Revue de Chimie mine rale, t, 6, 1969; p. 819; Studies on the systems $V_2O_5$–CuO or $Ag_2O$ or $Tl_2O_3$ and on the corresponding interoxide combinations.

Pascal Fleury; Revue de Chimie minerale; t. 6, 1969, p. 819; Estudes sur les systems $V_2O_5$–CuO ou $Ag_2O$ ou $Tl_2O_3$ et sur leat combinaisons interoxydes correspondantes.

Andre Casalot and Michel Pouchard; No. 668 Bulletin de la Socie te Chimique de France 1967, No. 10, pp. 3817–3820; A Chemical and Crystallization St Study.

Andre Casalot et Michel Pouchard; Service de Chimie Minerale Structurale de la Faculte des Sciences de Sciences de Bordeaux associe au CNRS; 3817, 1967.

Bernard Raveu; Mineral Chemistry Laboratory II Faculty of Science of Caen; Studies on the V–Ag–O and V–Cu–O systems no date available.

Bernard Raveau; Revue de Chimie minerale, t. 4, 1967, p. 729; Etudes sur les systemes V–Ag–O et V–Cu–O.

Pascal Fleury and Robert Kohmuller Mineral Chemistry–On The System $Ag_2O$–$V_2O_5$; Jan. 24, 1966.

Pascal Fleury et Robert Kohmuller; C. R. Acad. Sc. Paris, t. 267, 1966; Chimie Minerale; $Ag_2O$–$V_2O_5$.

*Primary Examiner*—Kathryn Gorgos
*Attorney, Agent, or Firm*—Hodgson, Russ, Andrews Woods & Goodyear

[57] ABSTRACT

A method for preparing a cathode having as active material silver vanadium oxide formed by chemical addition, reaction or otherwise intimate contact of a silver-containing component and a vanadium-containing compound to form a mixed metal oxide bronze that is thermally treated and rapidly cooled to form an amorphous product. The method of the present invention provides an alternate preparation technique for improving chemical control in the formation of a cathode for incorporation into an electrochemical cell.

63 Claims, 4 Drawing Sheets

PREPARATION OF SILVER VANADIUM OXIDE CATHODES USING AG2O AND V2O5 AS STARTING MATERIALS

This is a continuation of application Ser. No. 08/066,982 filed on May 25, 1993, now abandoned.

BACKGROUND OF THE INVENTION

1. Field of Invention

This invention relates to the manufacture of an alkali metal electrochemical cell or battery, and more particularly to new and improved methods of preparing silver vanadium oxide composite cathode material for use in high energy density batteries.

2. Discussion of the Prior Art

Solid cathode, liquid organic electrolyte and alkali metal lithium anode cells or batteries are used as the power source for implantable medical devices. The cathode of such a cell may have as active material carbon fluoride, a metal oxide, a mixed metal oxide such as silver vanadium oxide, or other suitable material as disclosed in U.S. Pat. No. 4,830,940 to Keiter et al., which patent is assigned to the assignee of the present invention and is incorporated herein by reference.

Preparation of cathode material containing a mixed metal oxide such as silver vanadium oxide for use in a lithium cell or battery has been known by a decomposition reaction. However, the decomposition method of preperation is accompanied by the evolution of gaseous products. Typically, the synthesis is carried out by first thermally decomposing a vanadium salt to produce vanadium pentoxide. A decomposable metal salt, preferably containing silver, is then blended with the vanadium pentoxide in water and the mixture is oven-dried. Following drying, the mixture is again blended and ground to ensure thorough intermingling of the constituents and the resulting homogeneous mixture is subsequently baked for a final heating/decomposition period. Depending on the starting materials used, this final heating/decomposition period can result in the release of toxic by-product gases. For example, if silver nitrate (AgNO$_3$) is used as the silver source, nitrous oxide type gases may be formed. Such a decomposition reaction for the preparation of silver vanadium oxide is:

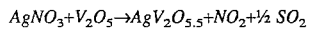

$$AgNO_3 + V_2O_5 \rightarrow AgV_2O_{5.5} + NO_2 + \tfrac{1}{2} SO_2$$

Upon cooling, the baked material is blended with appropriate amounts of carbon black and graphite powder to enhance conductivity, and with a binder material, and then pressed to form the cathode. Such a method is described in more detail in U.S. Pat. No. 4,310,609 to Liang et al., which patent is assigned to the assignee of the present invention and is incorporated herein by reference.

Accordingly, the present invention provides several methods for the preparation of amorphous silver vanadium oxide by chemical addition, reaction, or otherwise intimate contact of a silver containing component preferably Ag$_2$O, with a vanadium-containing compound to form a mixed metal oxide bronze. The mixed metal oxide is then rendered amorphous by baking, followed by rapid cooling.

References related to the art of forming a mixed metal oxide by reacting a vanadium-containing compound with silver oxide (Ag$_2$O) include:

P. Fleury "Revue de Chimie minerale," 6:819–851, 1969), describes the establishment of an equilibrium diagram between liquid and solid phases of three systems formed by the solid state reaction of V$_2$O$_5$ and CuO, Ag$_2$O and Ti$_2$O$_3$, and the study of newly discovered solid phases.

A. Casalot et al. "Bulletin de la Societe Chimique de Franc," 10:3817–3820, 1967), describes a study of the Ag$_2$O-V$_2$O$_3$-VO$_2$ system in an alpha phase comprising a solid solution of Ag$^+$ ions in V$_2$O; a monoclinic, beta phase being an isotope of homologous phases existing for the insertion of other monovalent elements, and a gamma, pseudo-orthorhombic phase.

B. Rayeau "Revue de Chimie minerale", 4:735–758, 1967), describes the limited relations between the various phases of the V-Ag-O system formed under vacuum, formed in an inert atmosphere, formed in an oxygen atmosphere as well as reaction studies of oxidation and reduction in the V-Ag-0 system to show that no new phases were obtained.

P. Fleury et al. "C.R. Acad. Sc. Paris," 262:475–477, 1966) describe the crystallization of melted (molten) mixtures of the Ag$_2$O-V$_2$O$_5$ system.

E. Wenda "Journal Of Thermal Analysis," 879–889, 1985), discusses phase equilibria in the V$_2$O$_5$-Ag:O system at a constant oxygen pressure (0.2 atm). The phase diagram found under these conditions was compared with the same system in vacuum and at an oxygen pressure of 1 atm in an attempt to construct the hypothetical phase diagram of V$_2$O-Ag$_2$O-O$_2$.

Published European patent application 0 478 303 A3 discloses a cathode material for electrochemical cells of a silver vanadium oxide prepared by a chemical combination or addition reaction but the silver vanadium oxide so prepared is not amorphous.

It is, therefore, an object of this invention to provide new and improved methods for preparing a silver vanadium oxide composite cathode for use in high energy density batteries.

It is another object of the present invention to provide new and improved methods for preparing silver vanadium oxide using Ag$_2$O and V$_2$O as starting materials.

It is still another object of the present invention to provide new and improved methods for preparing silver vanadium oxide as an amorphous material.

It is a further object of this invention to provide improved chemical control for the formation of a mixed metal oxide cathode material.

SUMMARY OF THE INVENTION

The present invention relates to new and improved methods of preparing silver vanadium oxide composite cathode material for use in high energy density batteries. The present invention comprises various methods by which a cathode is formed from materials that include amorphous silver vanadium oxide prepared by the chemical addition, reaction or otherwise intimate contact of several metal oxides during thermal treatment in mixed states, followed by rapid cooling of the mixed metal oxide, and may include an electronic conductor and binder materials. The silver vanadium oxide composite material prepared by the methods of the present invention results in the intercalation of silver ions into starting materials comprising one or more vanadium-containing compounds through intimate contact of silver-containing component, preferably Ag$_2$O, with the vanadium-containing compound, followed by thermal treatment and then rapid cooling wherein an amorphous mixed metal oxide is formed. Such vanadium-containing compounds include, but are not limited to, silver vanadate, vanadium oxide salt and vanadium oxides, with vanadium oxides being preferred.

Cathode plates can be formed by an entirely dry pressing procedure thereby enhancing the shelf life of the resulting plates. Alternatively, the procedure can include dropwise addition of liquid electrolyte to the cathode mixture prior to pressing to enhance the performance and discharge rate capability of an assembled cell incorporating the cathode. The discharge characteristic of the electrochemical cell containing the cathode of the present invention is a gradually sloping, rather than stepped discharge characteristic.

BRIEF DESCRIPTION OF THE DRAWINGS

The above and other objects, features, and advantages of the present invention will be apparent in the following detailed description of the preferred embodiments taken in conjunction with the accompanying drawings, in which.

DETAILED DESCRIPTION OF THE INVENTION

Figure 1:
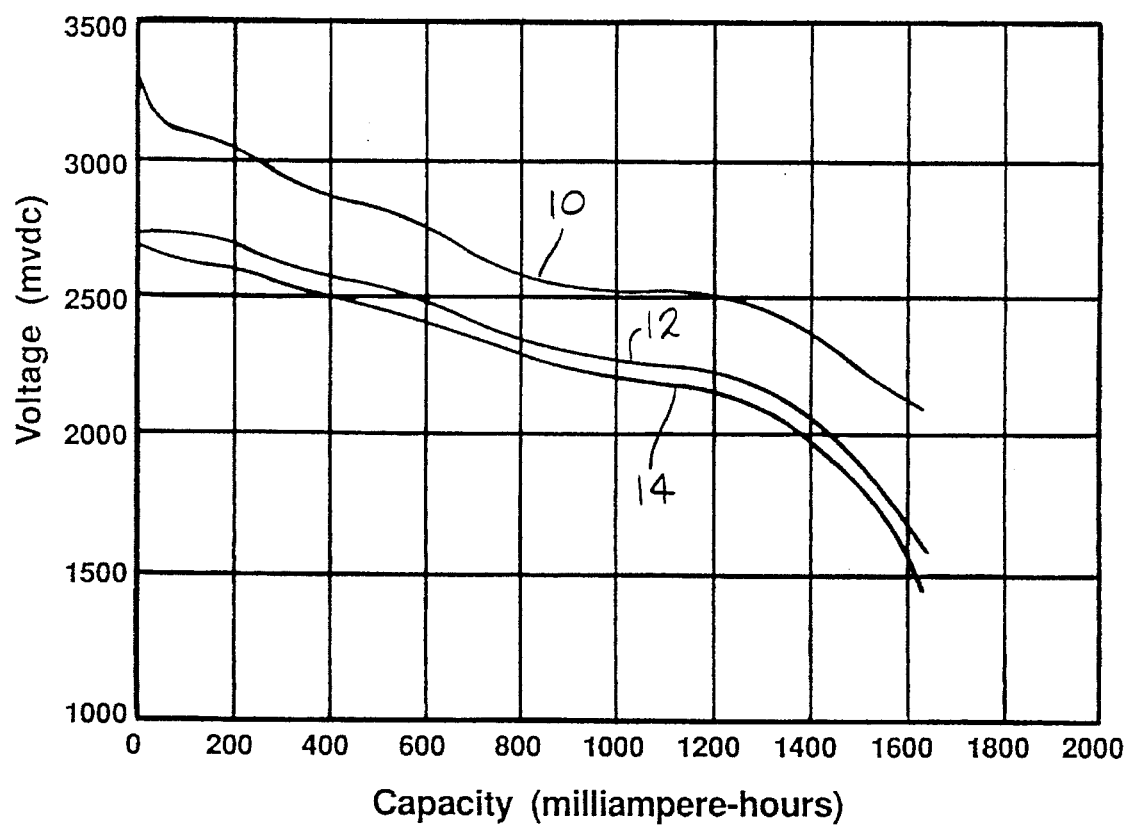
FIG. 1 is a graph showing the discharge curves of a cell containing silver vanadium oxide as a cathode made from $AgNO_3$ and $V_2O_5$ according to the prior art decompostion method.

One method of the present invention comprises synthesizing silver vanadium oxide from starting materials including intimately combining in an addition reaction a vanadium-containing compound and a silver-containing component. The silver-containing component may include silver oxide, silver iodide, a silver vanadate, silver metal, silver carbonate, or a combination thereof, silver oxide being most preferred. The addition reaction is carried out by thoroughly grinding the starting materials together, thermally treating the combined starting materials and rendering the mixture amorphous by rapid cooling. Preferably, a non-metallic oxide salt, preferably a phosphorous oxide salt such as $P_2O_5$, is added to the starting ingredients as a dopant to enhance the breakdown of the crystalline mixtures to render the product amorphous. The thermal treatment is preferbly carried out at between about 750°–775° C., more preferably at about 760° C., for about one to two hours. Following thermal treatment, the mixed metal oxide is rapidly cooled to yield silver vanadium oxide in an amorphous state.

Alternatively, the vanadium-containing oxide compound can be rendered amorphous prior to being intimately combined with the silver-containing component in an addition reaction. In this case, the dopant material is added to the vanadium-containing compound to retard formations of crystalline structure before the vanadium-containing compound is rendered amorphous by heating to between about 750°–775° C., preferably about 760° C. for about one to two hours followed by rapid cooling. The amorphous vanadium-containing component is finally combined with the silver-containing compound in an addition reaction to form the product.

A crystalline silver vanadium oxide is formed by a chemical addition or reaction by thermally treating the silver-containing component with the vanadium-containing compound and then slowly cooling the resulting combination. The addition reaction may be carried out at temperatures of from between about 300°–700° C., preferably at temperatures of between about 350°–550° C. and most preferably at temperatures of between about 380°–400° C. and may proceed to completion within about 5 to 24 hours. Lower temperatures require a longer reaction time. Longer reaction times and higher temperatures may lead to diminished rate capability in cells utilizing the silver vanadium oxide material due to undesirable grain growth. Therefore, in general, lower temperatures are preferred in order to limit grain growth in the silver vanadium oxide product. The reaction is preferably carried out in an oxidizing atmosphere that can include air and oxygen, or the reaction may be carried out in an inert atmosphere including for example argon, nitrogen and helium. The crystalline product does not require the use of a dopant.

Preparation of the electrochemical cell is completed by combining the amorphous silver vanadium oxide with an electronic conductor and with a binder material, and finally pressing the composite materials to form a cathode plate.

Figure 2:
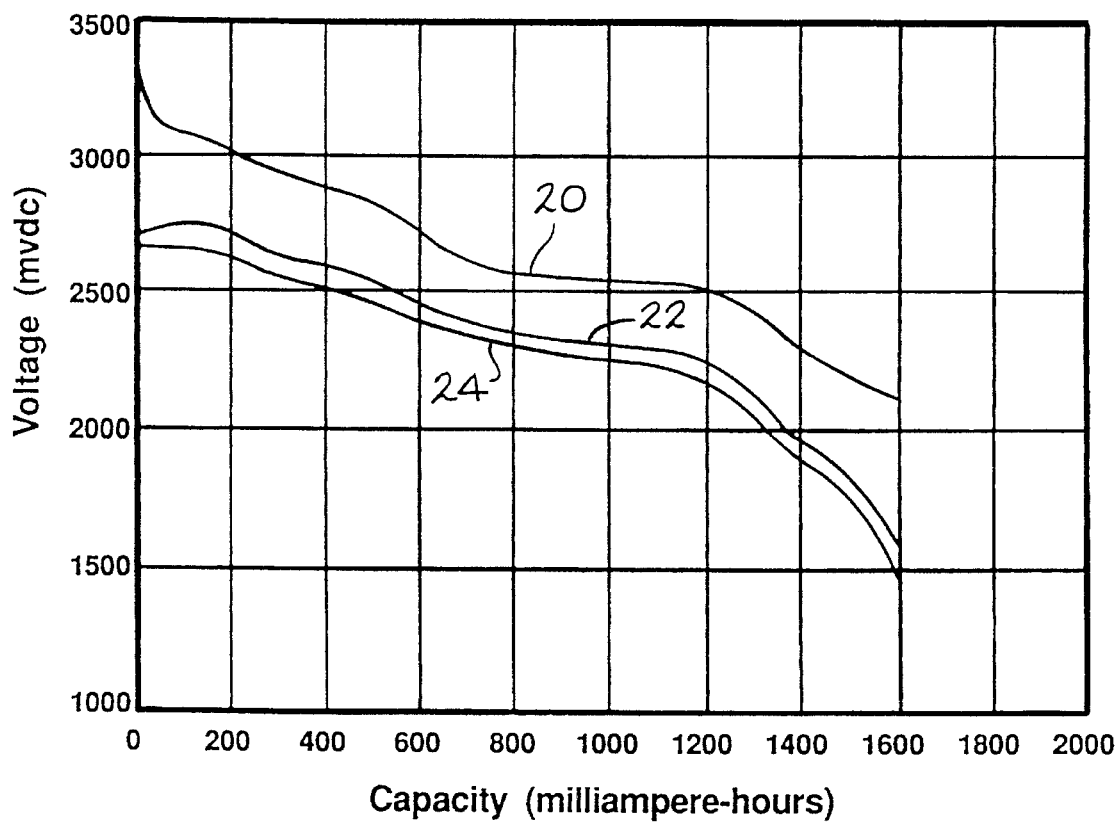
FIG. 2 is a graph showing the discharge curve of a newly assembled cell containing crystalline silver-vanadium oxide as a cathode produced by the chemical combination or addition reaction of $Ag_2O$ and $V_2O_5$ in accordance with the present invention.

The discharge curves for a cell or battery using the amorphous silver vanadium oxide material have different characteristics than cells incorporating a crystalline silver vanadium oxide. In addition, the use of silver oxide avoids the liberation of toxic fumes generated by use of silver nitrate ($AgNO_3$) as the silver starting material, such as is used in the the decomposition reaction previously discussed. FIGS. 1 and 2, respectively, illustrate discharge curves for electrochemical cells using silver vanadium oxide made by decomposing $AgNO_3$ with a vanadium-containing compound according to the prior art (FIG. 1) and made according to an addition reaction by thermally treating $Ag_2O$ (FIG. 2) as the silver-containing component intimately combined with a vanadium-containing compound in an addition reaction to form a crystalline silver vandium oxide according to the present invention. The electrochemical discharges were accomplished by applying pulse trains consisting of four ten-second, 1.5 ampere pulses every 15 seconds repeated every 30 minutes to the respective cells.

Thus, FIG. 1 shows discharge curves for a high energy density cell containing silver vanadium oxide made according to the prior art decomposition method wherein curve 10 was recorded at open circuit with no load, curve 12 was constructed from the minima of the first pulse of each train and curve 14 was constructed from the minima of the fourth pulse of each train. In comparison, FIG. 2 shows a high energy density cell containing crystalline silver vanadum oxide as a cathode material made by an addition reaction between a silver-containing component and a vanadium-containing compound, wherein curve 20 was recorded at open circuit with no load, curve 22 was constructed from the minimum of the first pulse of each pulse train and curve 24 was from the fourth pulse minima of each pulse train. The latter cell of the present invention shows flattened plateau regions with less pronounced fall off in discharge approaching end of life in comparison to the former, prior art cell.

Figure 3:
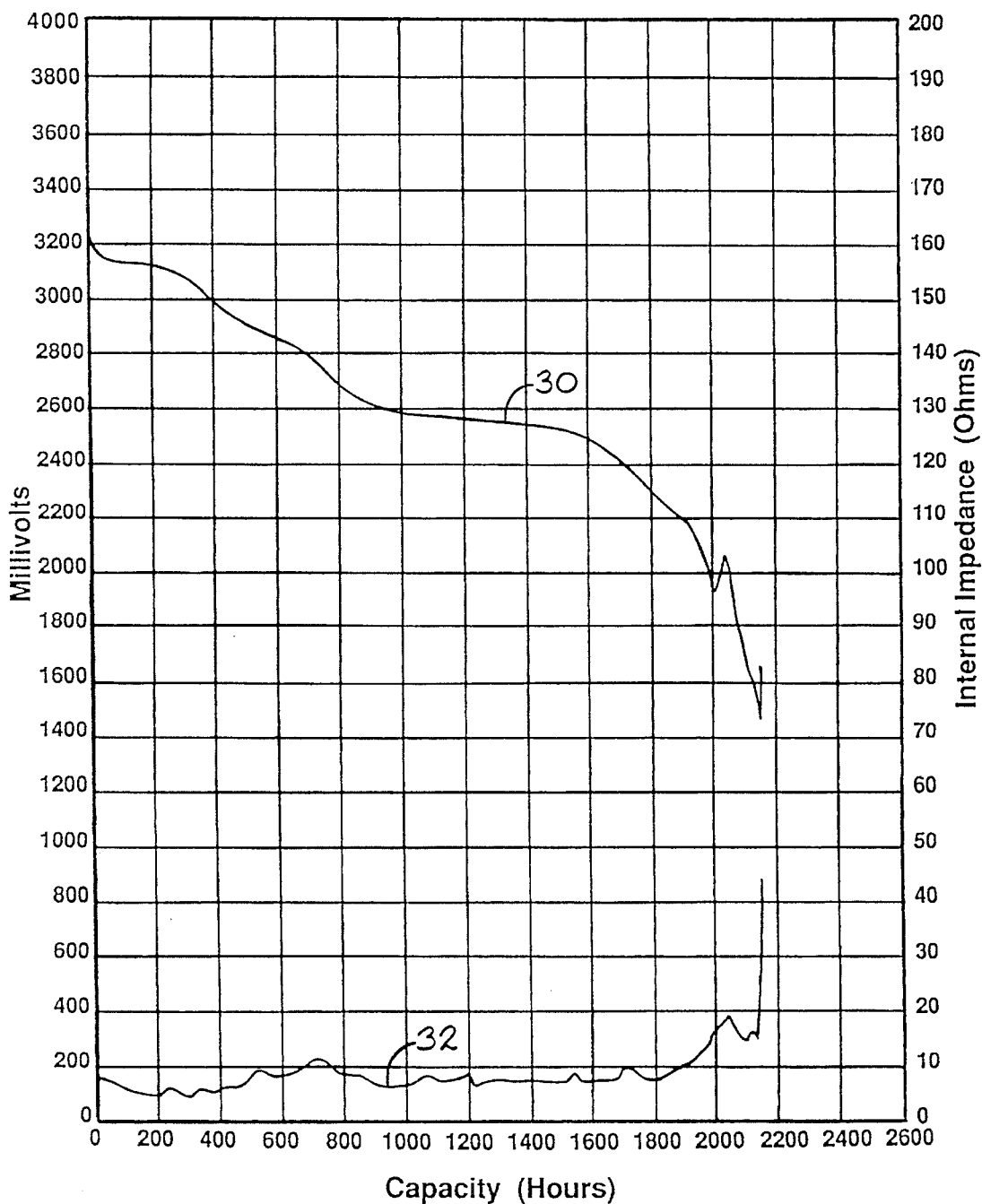
FIG. 3 is a graph showing the discharge and internal impedance curves of a cell containing silver vanadium oxide as a cathode made from $AgNO_3$ and $V_2O_5$ according to the prior art decomposition method.
Figure 4:
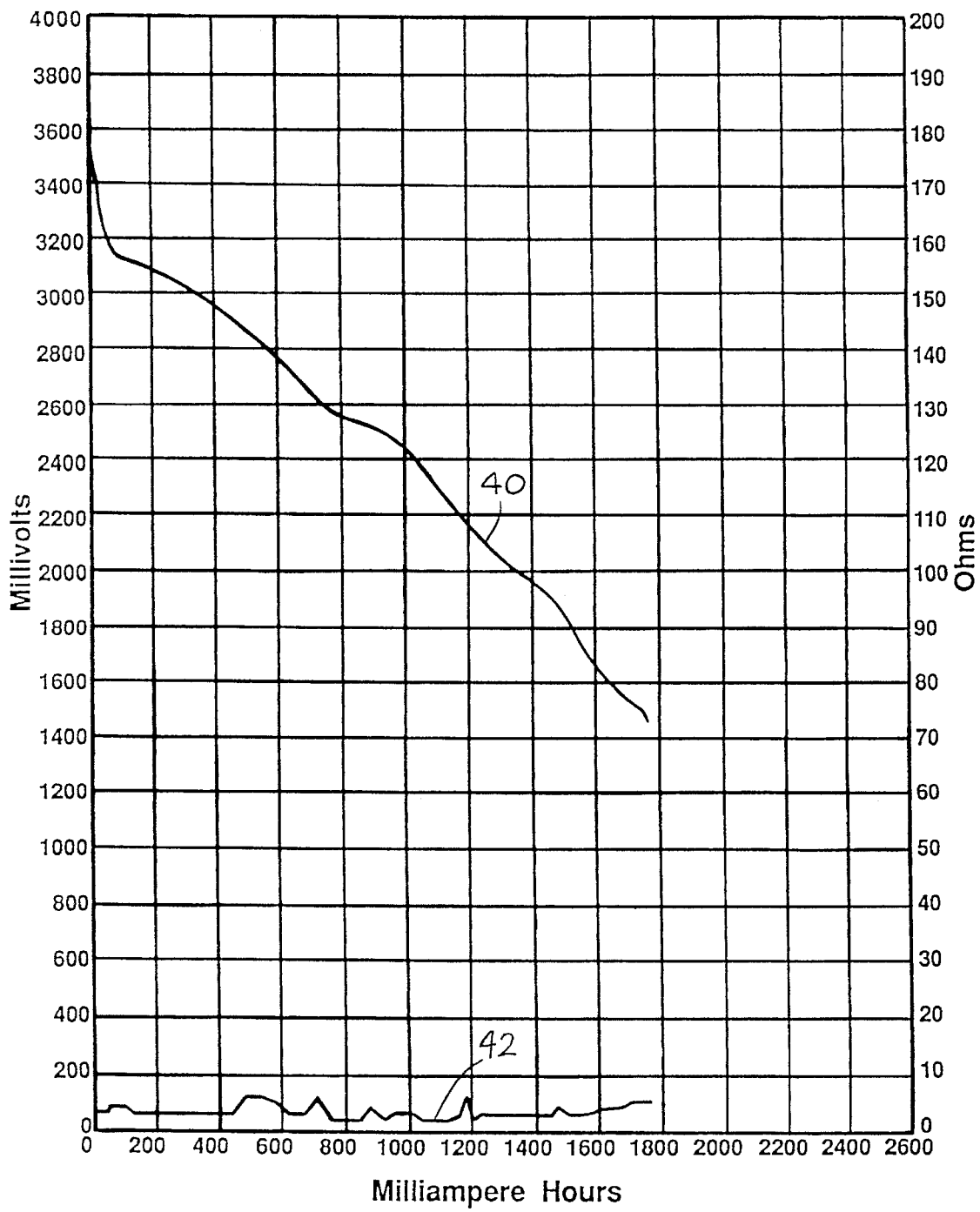
FIG. 4 is a graph showing the discharge curves and internal impedance of a newly assembled cell containing a cathode produced by the chemical combination or addition reaction of $Ag_2O$ and $V_2O_5$ and in an amorphous state in accordance with the methods of the present invention.

FIG. 3 illustrates discharge and internal impedance curves 30 and 32, respectively, for an electrochemical cell using silver vanadium oxide made by a decomposition reaction between $AgNO_3$ and a vanadium-containing material while FIG. 4 illustrates discharge and internal impedance curves 40 and 42, respectively, for an electrochemical cell made by an addition reaction of $Ag_2O$ and $V_2O_5$ as an amorphous silver vanadium oxide according to the present invention. The respective cells were run down using a 5 kohm load. The sloping discharge curve of FIG. 4 indicates that crystalline silver vanadium oxide is not present in the amorphous material. This contrasts with the stepped discharge of the decomposition product in FIG. 3. The difference in the shape of the discharge curves of a cell using silver vanadium oxide product by an addition reaction in a crystalline state (FIG. 2) and amorphous state (FIG. 4) also illustrate that the discharge curve can be tailored to a desired shape. This may be important for particular applications and uses. Varying the silver content also allows the shape of the discharge curve to be adjusted.

A cathode, containing cathode active material prepared by the methods of the present invention, can be used in a nonaqueous lithium battery as described by U.S. Pat. No. 4,830,940 to Keister et al., wherein the battery also contains an alkali metal anode, preferably lithium or alloys thereof; a nonaqeuous electrolyte which preferably is comprised of a combination of lithium salt and an organic solvent; and a separator material electrically insulating the anode from the cathode while having sufficient porosity to allow for electrolyte flow.

The methods of preparation of silver vanadium oxide composite material for use as cathode active material in a cathode, and an electrochemical cell incorporating the cathode according to the present invention, are illustrated further by the following examples.

EXAMPLE I

A cathode was formed from materials including silver vanadium oxide prepared by intimate contact of the silver-containing component with the vanadium-containing compound in the following manner. A 1 mole % phosphorous pentoxide ($P_2O_5$) in vanadium pentoxide ($V_2O_5$) mixture was heated at 760° C. for one hour and then poured onto a titanium foil cooled over liquid nitrogen. Silver oxide ($Ag_2O$) was added to the amorphous $P_2O_5/V_2O_5$ mixture with the Ag:V ratio being 1:2. The resulting mixture was baked at 400° C. for 16 hours to form silver vanadium oxide according to the present invention. The silver vanadium oxide thus formed was mixed with carbon black and graphite as conductive diluents and polytetrafluoroethylene (PTFE) powder as a binder material to form a depolarizer which was pressed into cathodes for use in electrochemical cells. A cathode comprising 3% conductive materials, 3% PTFE and 94% silver vanadium oxide made according to the method of the present invention was thus prepared. A battery cell was assembled using the foregoing cathode, lithium as the anode, 1M $LiAsF_6$ in propylene carbonate and dimethoxyethane as the electrolyte and a microporous polypropylene sheet as a separator. The weight of the cathode was 2.0 g. The open circuit voltage was 3.722 V. The cell delivered 0.542 Ah or 0.297 Ah/g based on the cathode active material to a 2 V cut-off under a drain rate of 0.5 mA/cm². The discharge curve was generally sloped.

EXAMPLE II

Silver vanadium oxide was prepared by in the following manner. A 10 mole % $P_2O_5$ in $AgV_2O_5$ mixture was heated to 760° C. for one hour. The heated mixture was then poured onto a titanium foil cooled over liquid nitrogen to form amorphous silver vanadium oxide according to the present invention. The silver vanadium oxide thus formed was mixed with carbon black and graphite as conductive diluents and PTFE powder as a binder material to form a depolarizer which was pressed into cathodes for use in electrochemical cells. A cathode comprising 3% conductive material, 3% PTFE and 94% silver vanadium was made according to the method of the present invention. A battery cell was assembled using the foregoing cathode, lithium as the anode, 1M $LiAsF6$ in propylene carbonate and dimethoxyethane as the electrolyte and a microporous polypropylene sheet as a separator. The weight of the cathode was 2.5 g. The open circuit voltage of the resulting cell was 3.67 V. The cell delivered 0.602 Ah or 0.270 Ah/g based on the cathode active material to a 2 V cut-off under a drain rate of 0.2 mA/cm². The discharge curve was generally sloped.

EXAMPLE III

Silver vanadium oxide was prepared in the following manner. A mixture of 1.77 g $P_2O_5$, 20.46 g of $O_5$ and 13.04 g of $Ag_2O$ was heated to 760° C. for one hour. The heated mixture was then poured into deionized water to form amorphous silver vanadium oxide according to the present invention. The silver vanadium oxide thus formed was mixed with carbon black and graphite as conductive diluents and PTFE powder as a binder material to form a depolarizer which was pressed into cathodes for use in electrochemical cells. A cathode comprising 3% conductive material, 3% PTFE and 94% silver vanadium oxide made according to the method of the present invention was thus prepared. A battery cell was assembled using the foregoing cathode, lithium as the anode, 1M $LiAsF6$ in propylene carbonate and dimethoxyethane as the electrolyte and a microporous polypropylene sheet as a separator. The weight of the cathode was 0.75 g. The resulting cell delivered 0.17 Ah or 0.241 Ah/g based on the cathode active material to a 2 V cut-off under a drain rate of 0.1 mA/cm². The discharge curve was generally sloped.

EXAMPLE IV

Silver vanadium oxide was prepared by heating a homogeneous mixture of $AgV_2O_5$ at 760° C. for one hour. The heated mixture was then poured into deionized water to form amorphous silver vanadium oxide according to the present invention. The silver vanadium oxide thus formed was mixed with carbon black and graphite as conductive diluents and PTFE powder as a binder material to form a depolarizer which was pressed into cathodes for use in electrochemical cells. A cathode comprising 3% conductive materials, 3% PTFE and 94% silver vanadium oxide made according to the method of the present invention was thus prepared. A battery cell was assembled using the foregoing cathode, lithiumas the anode, 1M $LiAsF6$ in propylene carbonate and dimethoxyethane as the electrolyte and a microporous polypropylene sheet as a separator. The weight of the cathode was 0.75 g The cell delivered 0.198 Ah or 0.282 Ah/g based on the cathode active material to a 2 V cut-off under a drain rate of 0.1 mA/cm². The discharge curve was generally sloped.

The above detailed description and examples are intended for the purposes of illustrating the invention and are not to be construed as limiting. For example, depending on the application of the electrochemical cell, the range of cathode compositions used can vary from 100% silver vanadium oxide to 80% silver vanadium oxide with 10% carbon/graphite and PTFE or other suitable conductor and binding materials known in the art.

The invention can be embodied otherwise without departing from the principles thereof, and such other embodiments are meant to come within the scope of the present invention as defined by the appended claims.

What is claimed is:

1. A method of making a cathode for an electrochemical cell comprising:
   a) combining a silver-containing component with a vanadium-containing compound by chemical addition or reaction to provide silver vanadium oxide as a mixed metal oxide having amorphous characteristics, wherein the amorphous characteristics are provided by heating to an elevated temperature with a dopant material to provide a molten state followed by quenching and wherein the dopant material is a non-metallic oxide salt that helps to provide the amorphous characteristics to the mixed metal oxide; and
   b) utilizing the mixed metal oxide having the amorphous characteristics to form a cathode for the electrochemical cell.

2. The method of claim 1 wherein providing the mixed metal oxide having the amorphous characteristics comprises:
   a) forming a first combination comprising the vanadium-containing compound combined with the dopant material;
   b) rendering the first combination amorphous by heating the first combination to the elevated temperature followed by quenching with the dopant material helping to cause the amorphous quality of the first combination;
   c) combining the silver-containing component with the amorphous first combination to provide a second combination; and
   d) heat treating the second combination to form the mixed metal oxide having the amorphous characteristics.

3. The method of claim 2 wherein the step of rendering the first combination amorphous comprises heating the first combination at the elevated temperature followed by pouring the first combination onto a liquid nitrogen cooled foil.

4. The method of claim 2 wherein the step of rendering the first combination amorphous comprises heating the first combination at the elevated temperature followed by pouring the first combination into deionized water.

5. The method of claim 1 wherein providing the mixed metal oxide having the amorphous characteristics comprises:
   a) forming an intimate combination comprising the vanadium-containing compound combined with the silver-containing component and the dopant material to form a mixed metal oxide; and
   b) rendering the mixed metal oxide amorphous by heating the mixed metal oxide to the elevated temperature followed by quenching with the dopant material helping to provide the mixed metal oxide having the amorphous characteristics.

6. The method of claim 5 wherein the step of rendering the intimate combination amorphous comprises heating the intimate combination comprising the mixed metal oxide at the elevated temperature followed by pouring the heated intimate combination onto a liquid nitrogen cooled foil.

7. The method of claim 5 wherein the step of rendering the intimate combination amorphous comprises heating the intimate combination comprising the mixed metal oxide at the elevated temperature followed by pouring the heated intimate combination into deionized water.

8. The method of claim 1 wherein the cathode is formed by pressing the amorphous mixed metal oxide into a desired shape.

9. The method of claim 8 wherein the forming of a cathode further comprises the addition of binder and conductor materials.

10. The method of claim 9 wherein the cathode comprises about 0 to 3 weight percent carbon, about 0 to 3 weight percent of a fluoro-resin powder, and about 94 to 99 weight percent amorphous silver vanadium oxide.

11. The method of claim 8 wherein the pressing of the mixed metal oxide further comprises the dropwise addition of a liquid electrolyte.

12. The method of claim 1 wherein the silver-containing component is selected from the group consisting of silver oxide, silver vanadate, silver metal, silver carbonate, and a combination thereof.

13. The method of claim 1 wherein the vanadium-containing compound is selected from the group consisting of silver vanadate, vanadium pentoxide, and a combination thereof.

14. The method of claim 1 wherein the elevated heating comprises baking at a temperature ranging from about 750°–775° C. for about 1 to 2 hours.

15. The method of claim 1 wherein the elevated heating comprises heating at about 760° C. for about one hour.

16. The method of claim 1 wherein the quenching comprises rapidly lowering the temperature to a liquid nitrogen temperature.

17. The method of claim 1 wherein the cathode comprises from about 80 weight percent to about 99 weight percent amorphous silver vanadium oxide.

18. A cathode for an electrochemical cell comprising as an active material silver vanadium oxide prepared from a silver-containing component combined with a vanadium-containing compound by chemical addition or reaction to provide the silver vanadium oxide as a mixed metal oxide having amorphous characteristics wherein the amorphous characteristics are provided by heating to an elevated temperature with a dopant material to provide a molten state followed by quenching and wherein dopant material is a non-metallic oxide salt that helps to provide the amorphous characteristics to the mixed metal oxide.

19. The cathode of claim 18 wherein the mixed metal oxide having the amorphous characteristics is formed from a first combination comprising a vanadium-containing compound combined with the dopant material and wherein the first combination is rendered amorphous by heating the first combination to the elevated temperature followed by quenching with the dopant material helping to cause the amorphous quality of the first combination and wherein the amorphous first combination is combined with the silver-containing component to provide a second combination that is subsequently heat treated to form the mixed metal oxide having the amorphous characteristics.

20. The cathode of claim 19 wherein the step of rendering the first combination amorphous comprises heating the first combination at the elevated temperature followed by pouring the intimate first combination concentration onto a liquid nitrogen cooled foil.

21. The cathode of claim 19 wherein the step of rendering the first combination amorphous comprises heating the first combination at the elevated temperature followed by pouring the intimate first combination into deionized water.

22. The cathode of claim 18 wherein the mixed metal oxide having the amorphous characteristics is formed from an intimate combination comprising the vanadium-containing compound combined with the silver-containing component and the dopant material to form a mixed metal oxide which is rendered amorphous by heating the mixed metal oxide to the elevated temperature followed by quenching with the dopant material helping to provide the mixed metal oxide having the amorphous characteristics.

23. The cathode of claim 22 wherein the step of rendering the intimate combination amorphous comprises heating the intimate combination comprising the mixed metal oxide at the elevated temperature followed by pouring the heated intimate combination onto a liquid nitrogen cooled foil.

24. The cathode of claim 22 wherein the step of rendering the intimate combination amorphous comprises heating the intimate combination comprising the mixed metal oxide at the elevated temperature followed by pouring the heated intimate combination into deionized water.

25. The cathode of claim 18 wherein the silver-containing component is selected from the group consisting of silver iodide, silver oxide, silver vanadate, silver metal, silver carbonate, and a combination thereof.

26. The cathode of claim 18 wherein the vanadium-containing compound is selected from the group consisting of silver vanadate, vanadium pentoxide, and a combination thereof.

27. The cathode of claim 18 further comprising binder and conductor materials.

28. The cathode of claim 18 the cathode comprises from about 80 weight percent to about 99 weight percent amorphous silver vanadium oxide.

29. The cathode of claim 18 wherein the elevated heating comprises baking at a temperature ranging from about 750°–775° C. for about 1 to 2 hours.

30. The cathode of claim 18 wherein the quenching comprises rapidly lowering the temperature to a liquid nitrogen temperature.

31. A nonaqueous electrochemical cell comprising a cathode containing an active material comprising silver vanadium oxide prepared from a silver-containing component and a vanadium-containing compound by chemical addition or reaction to provide the silver vanadium oxide as a mixed metal oxide having amorphous characteristics wherein the amorphous characteristics are provided by heating to an elevated temperature with a dopant material to provide a molten state followed by quenching and wherein dopant material is a non-metallic oxide salt that helps to provide the amorphous characteristics to the mixed metal oxide, the cell further comprising an alkali metal anode; a nonaqueous electrolyte comprising a combination of an organic solvent and a lithium salt; and a separator material, electrically insulating the anode from the cathode, and of a porosity to allow for electrolyte flow.

32. The electrochemical cell of claim 31 wherein the mixed metal oxide having the amorphous characteristics is formed from a first combination comprising a vanadium-containing compound combined with the dopant material and wherein the first combination is rendered amorphous by heating the first combination to the elevated temperature followed by quenching with the dopant material helping to cause the amorphous quality of the first combination and wherein the amorphous first combination is combined with the silver-containing component to provide a second combination that is subsequently heat treated to form the mixed metal oxide having the amorphous characteristics.

33. The electrochemical cell of claim 32 wherein the step of rendering the first combination amorphous comprises heating the first combination at the elevated temperature followed by pouring the intimate first combination concentration onto a liquid nitrogen cooled foil.

34. The electrochemical cell of claim 32 wherein the step of rendering the first combination amorphous comprises heating the first combination at the elevated temperature followed by pouring the intimate first combination into deionized water.

35. The electrochemical cell of claim 31 wherein the mixed metal oxide having the amorphous characteristics is formed from an intimate combination comprising the vanadium-containing compound combined with the silver-containing component and the dopant material to form a mixed metal oxide which is rendered amorphous by heating the mixed metal oxide to the elevated temperature followed by quenching with the dopant material helping to provide the mixed metal oxide having the amorphous characteristics.

36. The electrochemical cell of claim 35 wherein the step of rendering the intimate combination amorphous comprises heating the intimate combination comprising the mixed metal oxide at the elevated temperature followed by pouring the heated intimate combination onto a liquid nitrogen cooled foil.

37. The electrochemical cell of claim 35 wherein the step of rendering the intimate combination amorphous comprises heating the intimate combination comprising the mixed metal oxide at the elevated temperature followed by pouring the heated intimate combination into deionized water, 38. The electrochemical cell of claim 31 wherein the silver-containing component is selected from the group consisting of silver oxide, silver vanadate, silver metal, silver carbonate, and a combination thereof.

39. The electrochemical cell of claim 31 wherein the vanadium-containing compound is selected from the group consisting of silver vanadate, vanadium pentoxide, and a combination thereof.

40. The electrochemical cell of claim 31 wherein the anode is comprised of lithium.

41. The electrochemical cell of claim 31 wherein the elevated heating comprises baking at a temperature ranging from about 750°–775° C. for about 1 to 2 hours.

42. The electrochemical cell of claim 31 wherein the quenching comprises rapidly lowering the temperature to a liquid nitrogen temperature.

43. A method of making a cathode for an electrochemical cell comprising:

a) reacting a silver-containing component with a vanadium-containing compound by chemical addition or reaction to provide an amorphous mixed metal oxide wherein the step of reacting the silver-containing component with the vanadium-containing compound comprises forming a first combination comprising the vanadium-containing compound combined with a dopant material, rendering the first combination amorphous, combining the silver-containing component with the amorphous first combination to provide a second combination and heat treating the second combination to form the mixed metal oxide and wherein the dopant material is a non-metallic oxide salt that helps to provide the amorphous characteristics to the mixed metal oxide; and b) utilizing the amorphous mixed metal oxide to form the cathode for the electrochemical cell.

44. The method of claim 42 wherein the non-metallic oxide salt is a phosphorous oxide salt.

45. The method of claim 44 wherein the phosphorous oxide salt is phosphorous pentoxide.

46. A method of making a cathode for an electrochemical cell comprising:
   a) reacting a silver-containing component with a vanadium-containing compound by chemical addition or reaction to provide an amorphous mixed metal oxide wherein the step of reacting the silver-containing component with the vanadium-containing compound comprises forming an intimate combination comprising the vanadium-containing compound combined with the silver-containing component and a dopant material to form a mixed metal oxide and rendering the mixed metal oxide amorphous wherein the dopant material is a non-metallic oxide salt; and
   b) utilizing the amorphous mixed metal oxide to form the cathode for the electrochemical cell.

47. The method of claim 46 wherein the non-metallic oxide salt is a phosphorous oxide salt.

48. The method of claim 47 wherein the phosphorous oxide salt is phosphorous pentoxide.

49. A method of making a cathode for an electrochemical cell comprising:
   a) reacting a silver-containing component with a vanadium-containing compound by chemical addition or reaction to provide an amorphous mixed metal oxide; and
   b) utilizing the amorphous mixed metal oxide to form the cathode for the electrochemical cell wherein the cathode is formed by pressing the amorphous mixed metal oxide into a desired shape and wherein the pressing of the mixed metal oxide further comprises the dropwise addition of a liquid electrolyte.

50. A cathode for an electrochemical cell comprising as an active material amorphous silver vanadium oxide prepared from the reaction of a silver-containing component with a vanadium-containing compound by chemical addition or reaction to provide an amorphous mixed metal oxide as the amorphous silver vanadium oxide wherein the amorphous silver vanadium oxide is formed from a first combination comprising a vanadium-containing compound combined with a dopant material, which first combination is rendered amorphous and combined with the silver-containing component to provide a second combination that is subsequently heat treated to form the amorphous mixed metal oxide and wherein the dopant material is a non-metallic oxide salt that helps to provide the amorphous characteristic to the mixed metal oxide.

51. The cathode of claim 50 wherein the non-metallic oxide salt is a phosphorous oxide salt.

52. The cathode of claim 15 wherein the phosphorous oxide salt is phosphorous pentoxide.

53. The cathode of claim 50 wherein the quenching comprises rapidly lowering the temperature to a liquid nitrogen temperature.

54. A cathode for an electrochemical cell comprising as an active material amorphous silver vanadium oxide prepared from the reaction of a silver-containing component with a vanadium-containing compound by chemical addition or reaction to provide amorphous mixed metal oxide as the amorphous silver vanadium oxide that is utilized to form the cathode wherein the amorphous silver vanadium oxide is formed from an intimate combination comprising the vanadium-containing compound combined with the silver-containing component and a dopant material to form the mixed metal oxide which is rendered amorphous and wherein the dopant material is a non-metallic oxide salt that helps to provide the amorphous characteristic to the mixed metal oxide.

55. The cathode of claim 54 wherein the non-metallic oxide salt is a phosphorous oxide salt.

56. The cathode of claim 55 wherein the phosphorous oxide salt is phosphorous pentoxide.

57. The electrochemical cell of claim 56 wherein the quenching comprises rapidly lowering the temperature to a liquid nitrogen temperature.

58. A nonaqueous electrochemical cell comprising a cathode containing active materials comprising amorphous silver vanadium oxide prepared from the reaction of a silver-containing component with a vanadium-containing compound by chemical addition or reaction to provide an amorphous mixed metal oxide that is utilized to form the cathode for the electrochemical cell, wherein the amorphous mixed metal oxide as the amorphous silver vanadium oxide is formed from a first combination comprising a vanadium-containing compound combined with a dopant material, which first combination is rendered amorphous and combined with the silver-containing component to provide a second combination that is subsequently heat treated to form the mixed metal oxide and wherein the dopant material is a non-metallic oxide salt that helps to provide the amorphous characteristic to the mixed metal oxide the cell further comprising an alkali metal anode; a nonaqueous electrolyte comprising a combination of an organic solvent and a lithium salt; and a separator material, electrically insulating the anode from the cathode, and of a porosity to allow for electrolyte flow.

59. The electrochemical cell of claim 43 wherein the non-metallic oxide salt is a phosphorous oxide salt.

60. The electrochemical cell of claim 59 wherein the phosphorous oxide salt is phosphorous pentoxide.

61. A nonaqueous electrochemical cell comprising a cathode containing active materials comprising amorphous silver vanadium oxide prepared from the reaction of a silver-containing component with a vanadium-containing compound by chemical addition or reaction to provide an amorphous mixed metal oxide that is utilized to form the cathode for the electrochemical cell, wherein the amorphous mixed metal oxide as the amorphous silver vanadium oxide is formed from an intimate combination comprising the vanadium-containing compound combined with the silver-containing component and a dopant material to form a mixed metal oxide which is rendered amorphous and wherein the dopant material is a non-metallic oxide salt that helps to provide the amorphous characteristic to the mixed metal oxide the cell further comprising an alkali metal anode; a nonaqueous electrolyte comprising a combination of an organic solvent and a lithium salt; and a separator material, electrically insulating the anode from the cathode, and of a porosity to allow for electrolyte flow.

62. The electrochemical cell of claim 61 wherein the non-metallic oxide salt is a phosphorous oxide salt.

63. The electrochemical cell of claim 62 wherein the phosphorous oxide salt is phosphorous pentoxide.

* * * * *

UNITED STATES PATENT AND TRADEMARK OFFICE
CERTIFICATE OF CORRECTION

PATENT NO. : 5,498,494
DATED : March 12, 1996
INVENTOR(S) : Takeuchi et al.

It is certified that error appears in the above-identified patent and that said Letters Patent are hereby corrected as shown below:

In column 1, line 24, delete "Keiter" and insert --Keister--.

In column 1, line 45, delete "$\tfrac{1}{2}SO_2$" and insert --$\tfrac{1}{2}O_2$--.

Signed and Sealed this

Twenty-seventh Day of August, 1996

Attest:

BRUCE LEHMAN

Attesting Officer

Commissioner of Patents and Trademarks